(12) United States Patent
Semaan (10) Patent No.: US 7,173,936 B1
(45) Date of Patent: Feb. 6, 2007

(54) METHOD AND APPARATUS FOR PARTITIONING SONET FRAMES INTO LOGICAL CHANNELS TO OPTIMIZE BANDWIDTH UTILIZATION

(75) Inventor: Ghassan Semaan, Fremont, CA (US)

(73) Assignee: Ciena Corporation, Linthicum, MD (US)

( * ) Notice: Subject to any disclaimer, the term of this patent is extended or adjusted under 35 U.S.C. 154(b) by 438 days.

(21) Appl. No.: 09/658,778

(22) Filed: Sep. 11, 2000

(51) Int. Cl.
*H04L 12/42* (2006.01)
*H04L 12/64* (2006.01)

(52) U.S. Cl. .................. 370/395.51; 370/477; 370/907
(58) Field of Classification Search ................ 370/229, 370/230, 235, 242, 352, 386, 395.1, 400–404, 370/470, 473, 477, 902, 907, 395.51, 252
See application file for complete search history.

(56) References Cited

U.S. PATENT DOCUMENTS

| 5,793,745 | A | 8/1998 | Manchester ................. 370/224 |
| 6,075,787 | A | 6/2000 | Bobeck et al. ............... 370/395 |
| 6,201,788 | B1* | 3/2001 | Ishiwatari ................... 370/228 |
| 6,256,292 | B1* | 7/2001 | Ellis et al. ................... 370/227 |
| 6,301,254 | B1* | 10/2001 | Chan et al. ................. 370/397 |
| 6,317,414 | B1* | 11/2001 | Naohiro ...................... 370/222 |
| 6,349,092 | B1* | 2/2002 | Bisson et al. ................ 370/258 |
| 6,501,758 | B1* | 12/2002 | Chen et al. .............. 370/395.1 |
| 6,504,963 | B1* | 1/2003 | Fang et al. .................... 385/16 |
| 6,530,032 | B1* | 3/2003 | Shew et al. ..................... 714/4 |
| 6,532,088 | B1* | 3/2003 | Dantu et al. ................ 359/119 |
| 6,657,969 | B1* | 12/2003 | Neuendorff et al. ........ 370/245 |
| 6,674,771 | B1* | 1/2004 | Taniguchi ................... 370/505 |
| 6,697,373 | B1* | 2/2004 | Sandstrom .................. 370/405 |
| 6,798,779 | B1* | 9/2004 | Shimbashi et al. ...... 370/395.1 |
| 6,865,149 | B1* | 3/2005 | Kalman et al. ............. 370/225 |
| 6,888,791 | B1* | 5/2005 | Ellis et al. .................. 370/227 |
| 6,920,113 | B1* | 7/2005 | Kovvali et al. ............. 370/255 |
| 6,952,396 | B1* | 10/2005 | Cottreau et al. ............ 370/222 |
| 6,959,000 | B1* | 10/2005 | Lee ............................ 370/404 |

OTHER PUBLICATIONS

PCT, "International Search Report".

* cited by examiner

*Primary Examiner*—Doris H. To
*Assistant Examiner*—Ahmed Elallam
(74) *Attorney, Agent, or Firm*—Clements Walker; Christopher L. Bernard; Tyler S. Brown (57) ABSTRACT

A system for partitioning SONET frames into logical channels in a SONET ring is described. A SONET frame comprising a number of STS frames is subdivided into a plurality of logical channels. Each logical channel includes one or more STS frames. A protection layer is assigned to each logical channel. The protection layer may correspond to protection provided by the SONET ring or protection provided by network elements and specific to the type of data traffic transmitted within each channel. If SONET level protection for a particular logical channel is disabled, the bandwidth for the STS frames comprising that channel may be allocated among two or more nodes in the SONET ring.

21 Claims, 5 Drawing Sheets

METHOD AND APPARATUS FOR PARTITIONING SONET FRAMES INTO LOGICAL CHANNELS TO OPTIMIZE BANDWIDTH UTILIZATION

FIELD OF THE INVENTION

The present invention relates generally to telecommunication systems, and more specifically, to high-speed data transmission over fiber optic networks.

BACKGROUND OF THE INVENTION

The need to increase the capacity of data communications networks has led to the development of high-speed and high-capacity fiber optic based network systems. One of the major fiber optic network standards that has emerged in recent years is the Synchronous Optical Network or SONET system. SONET has developed into a high bit-rate fiber optic based transport system that provides the foundation for linking high-speed network switches and multiplexers. It is an intelligent system that provides advanced network management and a standard optical interface.

A SONET network is generally laid out in a ring architecture in which two or more transmission paths over fiber optic cables are provided between network nodes to form a closed loop. Time division multiplexing (TDM) is used to send multiple data streams simultaneously over the transmission paths. Traffic transmitted over a SONET ring may include standard synchronous data (e.g., DS1, DS3), Asynchronous Transfer Mode (ATM) data, and various types of packet data, such as IP (Internet Protocol) data and Frame Relay (FR) data.

SONET networks generally use a paired counter-rotating ring architecture to provide redundancy and protection against transmission failures. Defects or failures on a SONET ring can occur due to several causes, including defects in the fiber optic cable itself, problems in the network elements (nodes), or failures in the processing of a transmitted or received signal. Multiple protection mechanisms are defined for SONET. The most common protection systems are 1+1/1:1 (Bellcore GR-253-CORE), UPSR (Bellcore GR-1400-CORE) and BLSR (Bellcore GR-1230-CORE). ATM standards specify a different set of protection mechanisms. These mechanisms sometimes work in conjunction with the dedicated SONET protection mechanisms or independently of the SONET protection mechanism. SONET rings typically comprise one or more pairs of working rings and standby (or protection) rings. If a working link fails, the bandwidth capacity of the standby link is utilized. Specific mechanisms for monitoring, protecting, and recovering other types of traffic such as Frame Relay or IP are generally dictated by the network administrators or equipment manufacturers for systems that implement this type of traffic. Thus, various levels or layers of protection are provided for network traffic that is transmitted over a SONET ring.

Data is transmitted over a SONET ring in a sequence of synchronized frames. Each frame has a fixed bandwidth or transmission rate (expressed in Mbits per second), depending upon the electrical and optical characteristics of the circuitry implemented in the network elements in the ring. The bandwidth between each pair of nodes along a link is fixed, due to maximum allowable data rates provided by the SONET protocol. Although, in certain cases, it is possible to reallocate or distribute unused bandwidth among links in a SONET ring, such reallocation of bandwidth is typically performed without regard for the level of protection provided. Because of this limitation, bandwidth utilization in SONET rings is typically not optimized for the type and size of data messages transmitted over the networks in relation to the protection of mechanisms used.

Data traffic that utilizes only a fraction of the available bandwidth effectively occupies as much network space and traffic that utilizes the entire bandwidth of a data link in a SONET network. Moreover, similar bandwidth utilization and protection schemes are provided for all of the various types of traffic that can be transported over a SONET network. In the present state SONET network systems, no provision is generally made to optimize protection levels and bandwidth utilization depending upon the amount and type of traffic transmitted over the network. Therefore, present SONET network systems typically do not advantageously allocate bandwidth based upon the type or size of traffic transmitted.

SUMMARY OF THE INVENTION

A system for partitioning SONET frames into logical channels to optimize bandwidth utilization is described. A SONET frame comprising a number of Synchronous Transport Signal (STS) frames is subdivided into a plurality of logical channels. Each logical channel includes one or more STS frames. A protection layer is assigned to each logical channel. The protection layer may correspond to protection provided by the SONET ring or protection specific to the type of data traffic transmitted within each channel. If SONET level protection for a particular logical channel is disabled, the bandwidth for the STS frames comprising that channel may be allocated among two or more nodes in the SONET ring. Using this method, the bandwidth of the SONET frame is effectively partitioned into a number of logical channels, each channel possessing unique protection and bandwidth allocation characteristics.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENT

A system for partitioning a SONET frame into logical channels incorporating different protection levels is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Figure 1:
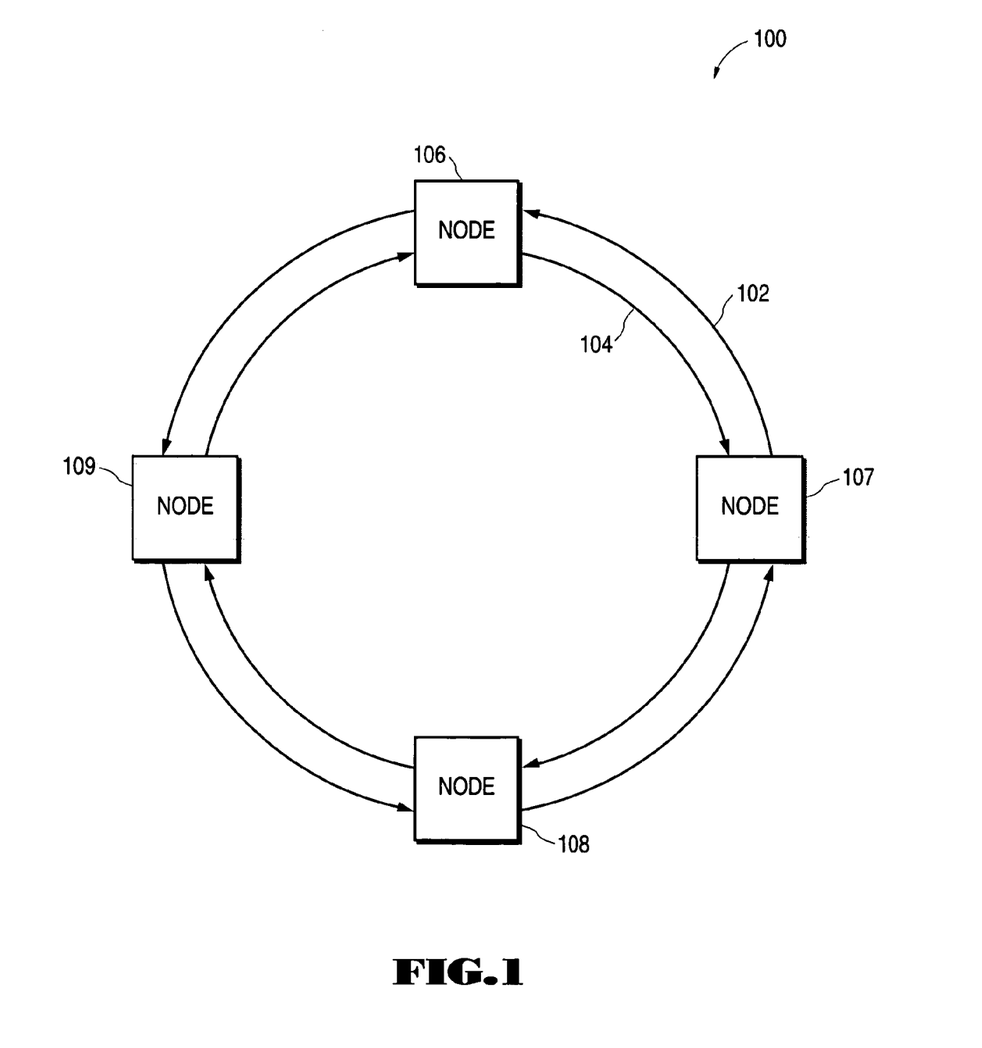
FIG. 1 illustrates a block diagram of a communication network system that implements embodiments of the present invention.

Embodiments of the present invention are intended to be used with SONET based fiber optic networks. SONET networks use two transmission paths between network nodes in a ring configuration. FIG. 1 is an architectural diagram of a SONET ring that implements a logical ring partitioning mechanism, according to one embodiment of the present invention. The SONET network 100 includes nodes 106 through 109 coupled through fiber paths 102 and 104. Each node represents a network element that is typically implemented as, or includes, a digital cross-connect system (DCS) or add-drop multiplexor (ADM). The type of device embodied by the nodes 106–109 depends upon the network environment and application in which the SONET ring is used. As add-drop multiplexor is a network device typically used by telecom carriers to switch and multiplex low-speed voice and data signals onto high-speed lines. These types of nodes are widely used with central office telephone switches and are typically used to aggregate several T1 lines into a higher speed electrical or optical line. A digital cross-connect is used to switch traffic between multiple SONET links, and serves to link high-speed lines to other high-speed lines.

The ring that connects the nodes 106 together in a SONET network is typically a bi-directional counter-rotating ring. This architecture facilitates the implementation of various protection measures. Any network is susceptible to various types of failures, at least to some degree. Such failures may include node failures, corrupted signals, damaged network lines, and other such failures. To minimize the risk of overall network collapse due to such a problem, a SONET ring includes two or more counter-rotating rings. One ring 104 is referred to as the "working" ring or fiber path and the other ring 102 is referred to as the "standby" or protection ring or fiber path. The working ring typically rotates clockwise and the standby ring rotates counter-clockwise around the network, however the actual directions of rotation for these rings may vary depending upon conventions adopted by the equipment manufacturers. The working ring 104 transmits data between the nodes 106–109. In UPSR protected systems, when a failure occurs, the standby ring 102 acts as a backup channel to and carries the bandwidth of the working ring for the network 100. In this manner, a failed node or link section can be bypassed using the appropriate bandwidth capacities of the working and standby rings. FIG. 1 illustrates a simple UPSR (Unidirectional Path Switched Ring) SONET ring topology comprising a two fiber unidirectional network. In this network, all data is transmitted using the bandwidth of the working path while the standby path is idle. When a failure in the working path occurs, the bandwidth of the standby path is utilized to transmit data.

A common implementation of a SONET network is the four fiber bi-directional network in which two separate fiber paths comprise the working ring, and two other separate fiber paths comprise the standby ring. For this topography, one working ring rotates clockwise, and the other rotates counterclockwise. Their respective standby rings rotate in opposite directions to form two separate counter rotating rings through each of the nodes. This type of system is quite robust, and is typically used in large carrier networks that must be well protected against a breakdown.

Other SONET network topographies, such as two fiber bi-directional, or four fiber unidirectional networks are also possible, and can be used in conjunction with embodiments of the present invention.

Figure 2:
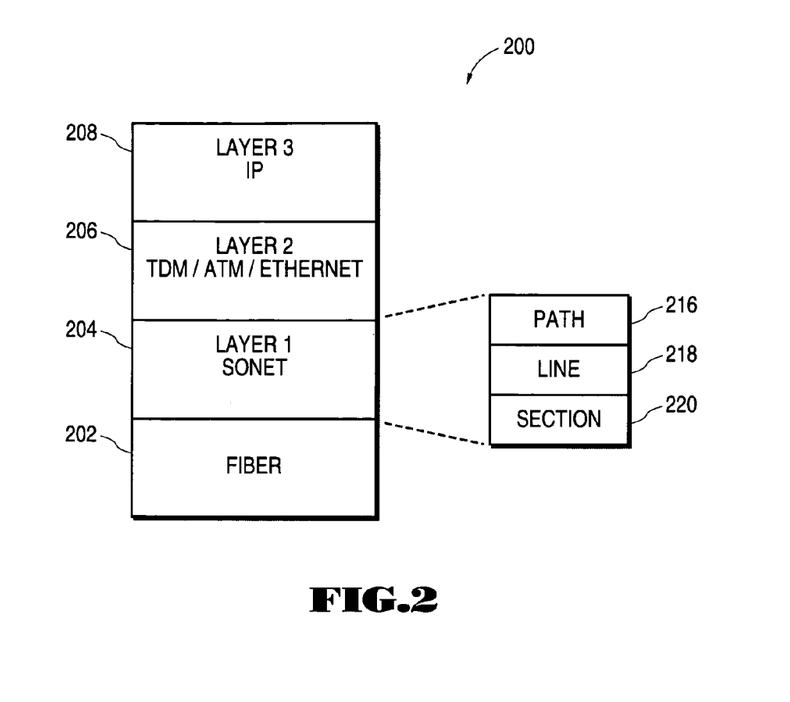
FIG. 2 illustrates the logical layout of a SONET network and its relationship to the general Internet Protocol (IP) system.

FIG. 2 illustrates the logical layout of a SONET network and its relationship to layers in the general Internet Protocol (IP) system. In a wide area network (WAN) or over the Internet, IP traffic typically comprises an upper layer 208 (denoted layer 3) of data. This data is typically managed by management layers that utilize various transmission methods, such as Asynchronous Transfer Mode (ATM), Time Division Multiplexing (TSM), Ethernet, or other similar types of transmission methods. These management layers are shown collectively as a second layer 206 (denoted layer 2) in FIG. 2. A SONET layer 204 (denoted layer 1) is used by the management layer (layer 2) to transmit the data over a fiber optic medium 202.

The SONET protocol 204 itself is divided into layers: a path layer 216, a line layer 218, and a section layer 220. These layers control photonic layer 202 (or fiber optic medium) that transports the binary digits over the fiber transmission path. The section layer 220 manages the transport of SONET data frames over the physical path using the photonic layer. The section layer 220 is involved with various tasks, such as section error monitoring, framing, and signal scrambling. The section layer 220 further serves to regenerate the signals at regular intervals over the fiber optic link. The line layer 218 is involved with the maintenance span of the SONET ring, and manages the transport of entire SONET payloads, which are embedded in a sequence of frames, across the fiber optic medium. The line layer is generally responsible for multiplexing the different path layers or data signals. The path layer 216 covers the end-to-end transmission over the SONET ring. This layer transports the actual network services between SONET multiplexing equipment.

Each of the layers 216–220 has a certain number of overhead bytes associated with it. These overhead bytes govern the function of each layer and are logically referred to as the Section Overhead (SOH), Line Overhead (LOH), and Path Overhead (POH) bytes.

In general, SONET uses time division multiplexing (TSM) to send multiple data streams simultaneously. User data, also referred to as 'payload' is carried over a SONET ring in a series of frames that follow the overhead bytes. The basic component of the SONET system is the Synchronous Transport Signal (STS) level one or STS-1 frame. This is the basic transmission frame used for the transport of a packages of bytes over the physical fiber optic link. The basic STS-1 SONET frame consists of 810 bytes transmitted once every 125 microseconds to a yield a 51.840 Mbps signal rate. An STS frame is composed of two main sections, each with their own structures. The first three columns of the STS-1 frame form the transport overhead for the entire frame. The SONET overhead information is divided into section, line, and path. The section and line overhead is included in the first three columns of the frame, and are sent as part of every SONET frame.

Figure 3:
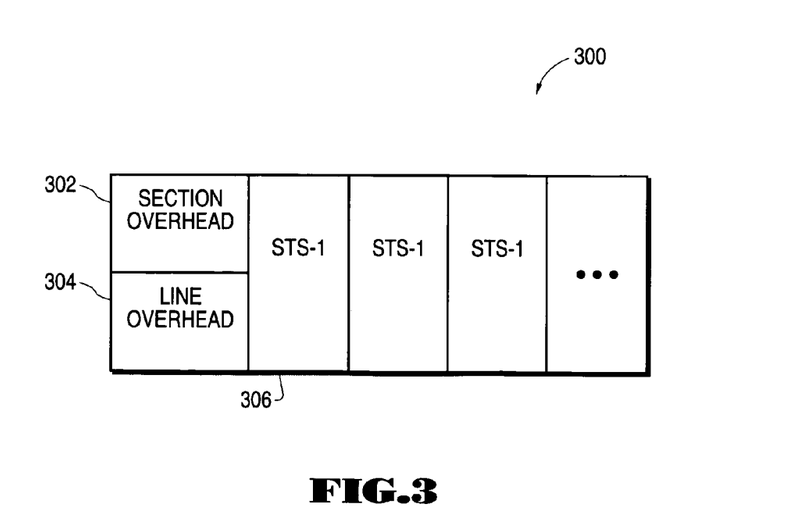
FIG. 3 illustrates the composition of a SONET frame that is used in conjunction with a SONET network that implements embodiments of the present invention.

FIG. 3 illustrates the composition of a SONET layer that is used in conjunction with a SONET network that implements embodiments of the present invention. The frame 300 comprises block 302 that represents the section overhead (SOH) bytes, block 304 that represents the line overhead (LOH) bytes, and the payload 306 comprising a series of STS-1 blocks of data. Together the SOH and LOH bytes are referred to as the transfer overhead (TOH) block. The path overhead (POH) is carried in a Synchronous Payload Envelope (SPE) that includes the user data. As illustrated in FIG. 3, each STS-1 block represents a bandwidth capacity of about 50 Mbps. It should be noted that the STS-1 payload blocks can also represent other types of payload frames, such as STS-3c, STS-9c, and so on, depending upon the optical and electrical levels used in the network system.

As illustrated in FIG. 2, the SONET layer basically comprises the first layer 204 in a fiber-optic based communication system for data transmission between two or more modes. On top of the SONET layer resides the second layer 206 management layer that uses the SONET layer to transmit data over a WAN or the Internet. The second layer could be implemented using various different traffic protocols, such as TDM (Time Division Multiplexing), ATM (Asynchronous Transfer Mode), or Ethernet. Present SONET systems typically incorporate certain protection mechanisms to ensure the integrity of data transmissions in the event of a ring failure. The protection mechanisms and redundant fiber optic media re an important feature of SONET based networks.

Embodiments of the present invention are intended to be utilized in conjunction with one or more protection mechanisms associated with the SONET layer 204. In one embodiment, the SONET ring of FIG. 1 implements a Bi-directional Switched Ring (BLSR) protocol. BLSR is a system that was developed by Bellcore to protect traffic over a SONET ring. BLSR provides support for the line layer 218 of the SONET ring. In an alternative embodiment, the protection mechanism could be implemented using unidirectional Path Protected Switched Ring (UPSR) mechanisms. UPSR provides protection for the path layer 216 of the SONET ring.

In one embodiment of the protection mechanisms provided by the layer 1 and layer 2 components are balanced against the bandwidth utilization requirements of the traffic transported over SONET rings. In present systems, bandwidth is typically not optimally utilized or distributed in SONET systems due to certain restrictions imposed by the layer 1 protection mechanisms. For data traffic that does not require such robust protection mechanisms, or for which layer 2 protection is sufficient, bandwidth allocation methods in accordance with embodiments of the present invention can be implemented.

Each link between the nodes in a SONET ring is of a fixed bandwidth. The smallest increment of data transmission is VT-1.5, which provides 1.7 Mbps of bandwidth, however, in general SONET applications, the smallest practical increment of data transmission used is STS-1 that provides 51–84 Mbps of bandwidth between nodes. The layer 2 cells, such as ATM cells are mapped onto the SONET layer using the STS frames or channel. Multiple STS-1 frames can be joined together to form concatenated STS frames as illustrated in FIG. 3. For example, combining three STS-1 frames creates and STS-3c frame, where the "c" suffix designates a concatenated STS-3 frame.

Each STS-1 frame is transmitted at a rate of 8,000 frames per second. These frames are transmitted whether there is any data in them or not. Since each link on the SONET ring is of a fixed bandwidth, any data stream that does not fill an STS channel goes wasted. Thus, for example, if only 10 Mbits is transmitted between node 106 and node 107 in FIG. 1, the remaining 40 Mbits of the STS-1 frame are wasted. Furthermore, standard SONET usage dictates that when transmitting between multiple nodes, each link between two nodes requires using its own STS frame. To alleviate bandwidth wastage, the SONET protocol allows mapping of lower rate signals (typically lower than DS-3) into sections of an STS-1 frame, and various bandwidth utilization measures have been implemented to reduce the waste associated with unused STS frames. For example, for ATM VP (virtual path) rings, switched or permanent virtual channels can be established among nodes in a SONET network to utilize the bandwidth in a single STS frame. Thus, for ATM VP rings, a single STS-1 frame can be shared between different nodes.

One disadvantage of the virtual channel mechanism for SONET rings is that protection mechanisms, such as BLSR or UPSR cannot be implemented at all. If an entire ring is configured as an ATM VP, so that the bandwidth for individual STS frames can be used by all of the nodes, standard SONET protection mechanisms are disabled. Though this allows the entire frame bandwidth to be shared by all of the nodes, frame protection is unavailable.

A second disadvantage associated with the virtual channel arrangement is that ensuring guaranteed bandwidth between the nodes requires relatively complex processes, such as statistical multiplexing. Whereas in a standard SONET ring, the bandwidth between any two nodes is known to be essentially 50 Mbps for a single STS-1 frame, for a virtual ring, this bandwidth changes depending upon the bandwidth requirements for a particular data transmission. This makes it difficult to implement synchronous protocols, such as TDM, where guaranteed bandwidth characteristics are important.

In one embodiment of the present invention a logical ring provisioning feature is implemented to allow the transmission of protected traffic and unprotected traffic over the SONET ring, and thereby allow support for both TDM and data traffic with adequate protection mechanisms in place. In one embodiment, various STS-1 frames are grouped together depending upon the protection or bandwidth utilization desired. Using the inventive logical ring provisioning feature, the transmission bandwidth of the SONET ring between every pair of nodes is essentially divided into different bandwidth groups. Each bandwidth group assigned a different level of protection capability.

Figure 4:
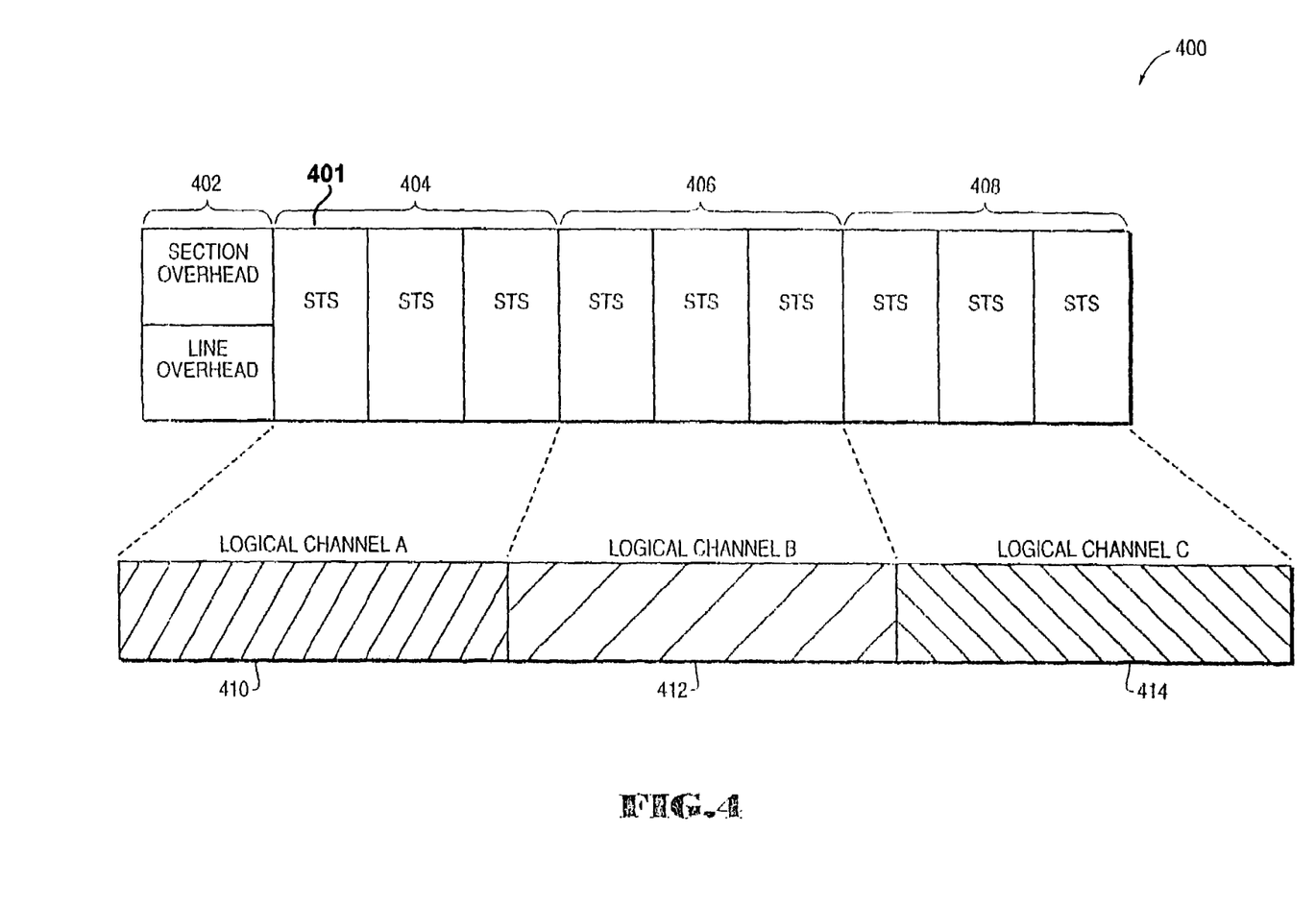
FIG. 4 illustrates the logical partitioning of the STS frames of a SONET ring, according to one embodiment of the present invention.

FIG. 4 illustrates the logical partitioning of the STS frames of a SONET ring, according to one embodiment of the present invention. The SONET layer 400 comprises the transport overhead section 402 followed by a number of STS frames. Each STS frame 401 is assumed to be an STS-1 frame for purposes of illustration. However, it should be noted that each frame 401 could represent an STS-3c or other type of STS frame. For the example illustrated in FIG. 4, the first three STS-1 frames are grouped together to form a block 404; the next three STS-1 frames are grouped together to form a block 406, and the final three STS-1 frames are grouped together to form a block 408. Each block 404–408 is represented as a logical channel within the entire STS frame bandwidth for the SONET payload. Thus, block 404 is represented as logical channel A 410, block 406 is represented as logical channel B 412, and block 408 is represented as logical channel C 414.

Each of the logical channels 410–414 can be assigned a different protection level. For example, channel A 410 can be implemented to use full SONET (layer 1) protection mechanisms, such as BLSR or UPSR. This would allow block 404 to be used to transmit TDM traffic that requires known bandwidth allocations and full protection mechanisms. It also allows this group of frames to operate with other standard SONET node devices. Likewise, channel B 412 can be implemented as an unprotected group of SONET frames. This allows the bandwidth provided by the block 406 group of STS-1 frames to be shared among all of the nodes in the network in an ATM VP ring configuration. The third channel, channel C 414 can be assigned to accommodate other types of protection mechanisms, including proprietary protection mechanism, to support, for example, Frame Relay protocols.

The logical frame partitioning scheme illustrated in FIG. 4 creates multiple logical rings embodied within the single physical ring comprising the SONET network. Each logical ring features different protection mechanisms, thus allowing different bandwidth utilization characteristics. For the STS frames in which full SONET protection is implemented, no bandwidth sharing is allowed, due to limitations in the link architecture of SONET. However, for STS frames in which layer 2 protection or no layer 1 protection is implemented, some degree of bandwidth sharing among the ring segments is allowed. This architecture advantageously eliminates the need to implement either full protection or no protection in an entire SONET ring or section of the ring. Different bandwidth groups within the SONET ring can be assigned different protection and bandwidth allocation levels. Thus, different transmission protocols, such as TDM, ATM or Frame Relay, can be mapped to different logical channels 410–414 within the same physical ring network.

Each group 404, 406, and 408 is shown as comprising three STS-1 frames, however, it should be noted that each group could compromise virtually any number of STS frames. Moreover, the groups can include different numbers of STS frames from each other. In one embodiment of the present invention, the size of each logical channel is predetermined with respect to size, in number of STS frames, and functionality in terms of protection level and protocol support. In an alternative embodiment, the size and functionality of each logical channel is dynamically configurable.

In general, the STS frames associated with a particular logical channel need not be contiguous. If however, the logical channels are composed of traffic of a particular data type, such as ATM or TDM data, then the STS format requirements of those protocols takes precedence. For example, it is advantageous for TDM data that the STS frames to be contiguous. In this case, if all TDM data was grouped in a particular logical frame, it is desirable that the STS frames for this traffic be contiguous.

Figure 5:
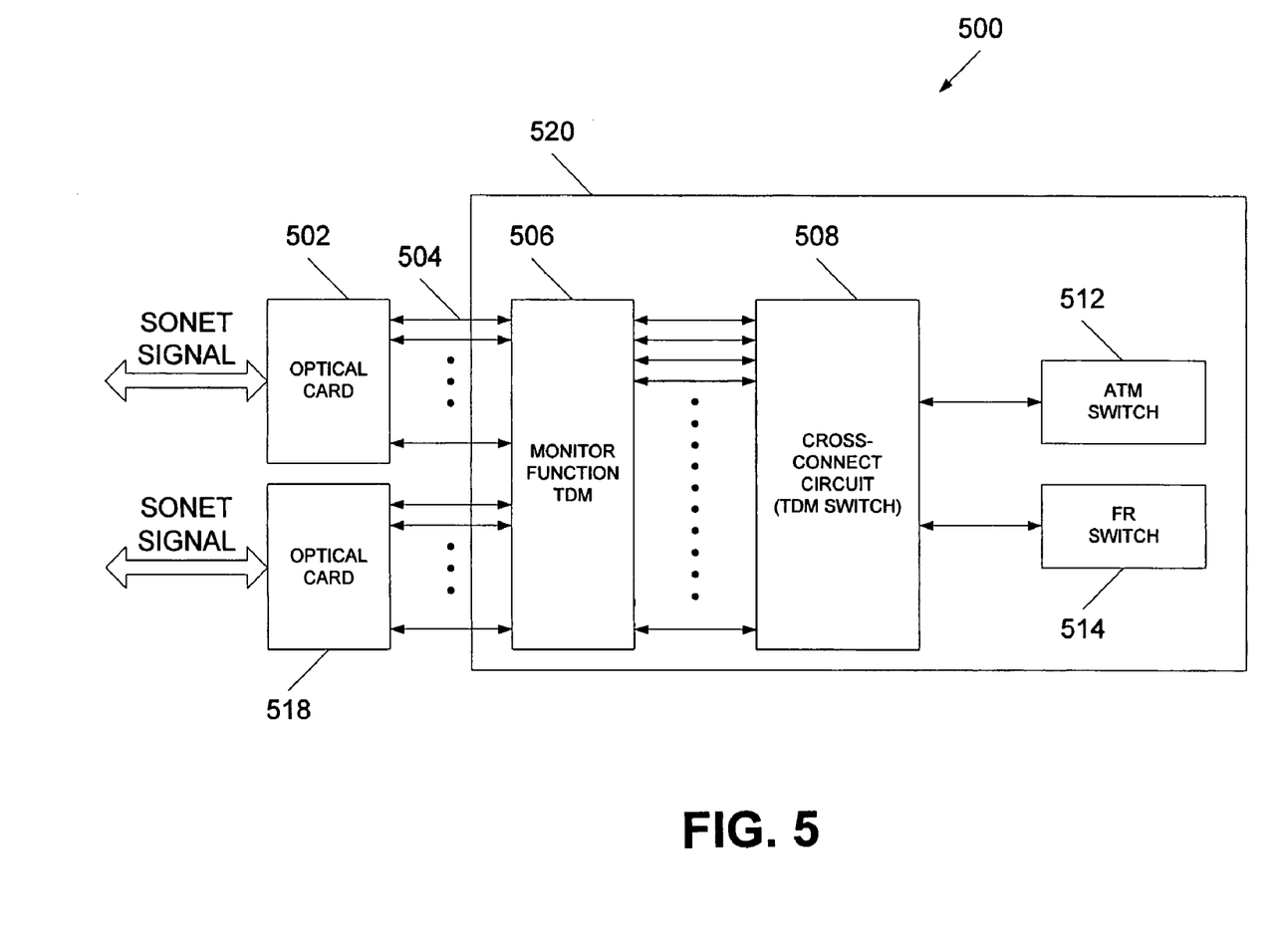
FIG. 5 illustrates a SONET network element that implements a logical ring partitioning mechanism, according to one embodiment of the present invention.

In one embodiment of the present invention, the logical SONET ring provisioning mechanism for assigning protection and bandwidth characteristics to different groups of STS frames is provided in one or more network nodes that implement SONET, ADM, DCS, or Frame Relay switching functionality, or any combination thereof. FIG. 5 illustrates a SONET network element that implements a logical ring partitioning mechanism, according to one embodiment of the present invention. In system 500, a SONET signal is received and transmitted by an optical network card 502. The optical card provides section termination, line termination, and other signal processing for the received SONET signals. The optical card then transmits a number (N) of bi-directional STS signals 504, depending upon the size of the SONET frame transmitted through the node. The STS signals are then transmitted through a cross-connect circuit 508. Cross-connect circuit 508 is a N×N cross connect corresponding to the N STS signals output from optical card 502. the cross-connect circuit 508 serves to map the appropriate STS signals to their proper switch, depending upon the type of network traffic the STS signals are carrying. ATM signals are routed to an ATM switch 512, and Frame Relay signals are routed to a Frame Relay switch 514. The cross-connect circuit 508 includes functionality to serve as a TDM switch. It will be appreciated that other types of STS signals and hardware switches other than those illustrated in FIG. 5 may also be provided. In one embodiment, the cross-connect circuit 508 and switches 512–514 are provided in a control card 520 coupled to the first and second optical cards 502 and 518. Typically, the three cards 502, 520, and 518 are implemented in the form of computer circuit boards in rack mount system comprising the network node.

In one embodiment of the present invention, the control card 520 within network element system 500 includes a monitor function 506. Monitor function 506 may be implemented as software processes executed by network element system 500. Alternatively, the functionality provided by monitor function 506 may be programmed into cross-connect circuit 508. For this embodiment, the protection mechanism for each logical channel of STS frames is programmed into the integrated circuit devices that comprise the cross-connect circuit 508. The monitor function 506 monitors the type of traffic transmitted over the N STS lines from the optical card 502. For example, the traffic could consist of Frame Relay data, or similar types of data typically transmitted over SONET networks. The cross-connect circuit 508 then routes the appropriate traffic to the proper switch.

In one embodiment of the present invention, the level of protection provided for each logical channel of STS frames is programmed into the control card 520. According to standard SONET convention, two different layers of protection are generally available. Layer 1 protection protects the traffic on the SONET layer, and layer 2 protection protects the traffic on the transmission protocol layer, e.g., ATM, TDM, and so on. For layer 2 protection, if there is a failure involving a particular type of data, the switch for that type of data addresses the failure. For example, in system 500, a fiber failure involving ATM traffic would be resolved using the ATM switch 512. Layer 1 protection protects all of the SONET traffic regardless of the type of data involved, and re-routes all of the traffic using a standby channel in the event of a failure. If layer 1 protection is provided, layer 2 protection is not effective, and the individual switches do not handle the failure recovery.

In one embodiment of the present invention, the control card 520 includes a programming provision to disable the layer 1 SONET level protection for particular STS frames. As illustrated in FIG. 4, the STS frames are first partitioned into logical channels. These channels are monitored by monitor function 506. In general, the assignment of logical frames will correspond to particular type of traffic. That is logical channel A may comprise all TDM traffic, logical channel B may comprise all ATM traffic, and so on. The appropriate protection layer is then assigned to each logical channel. If full SONET protection is desired for a particular channel or type of data, that channel will be assigned layer 1 protection. In this case, the bandwidth for this type of traffic cannot be shared among the nodes of the SONET network due to constraints imposed by the SONET standards.

If the bandwidth for a particular logical channel is desired to be shared among the nodes in the SONET network, the layer 1 protection should be disabled. In this case, if there is a failure, the STS frames for the unprotected channels will be dropped by the node. In some cases, there may still be some degree of protection available for these frames. For example, if layer 2 protection is available for these channels, such as in the case of ATM or FR traffic, these frames may be re-routed by the switches 508–514, in accordance with layer 2 protection mechanisms.

Figure 6:
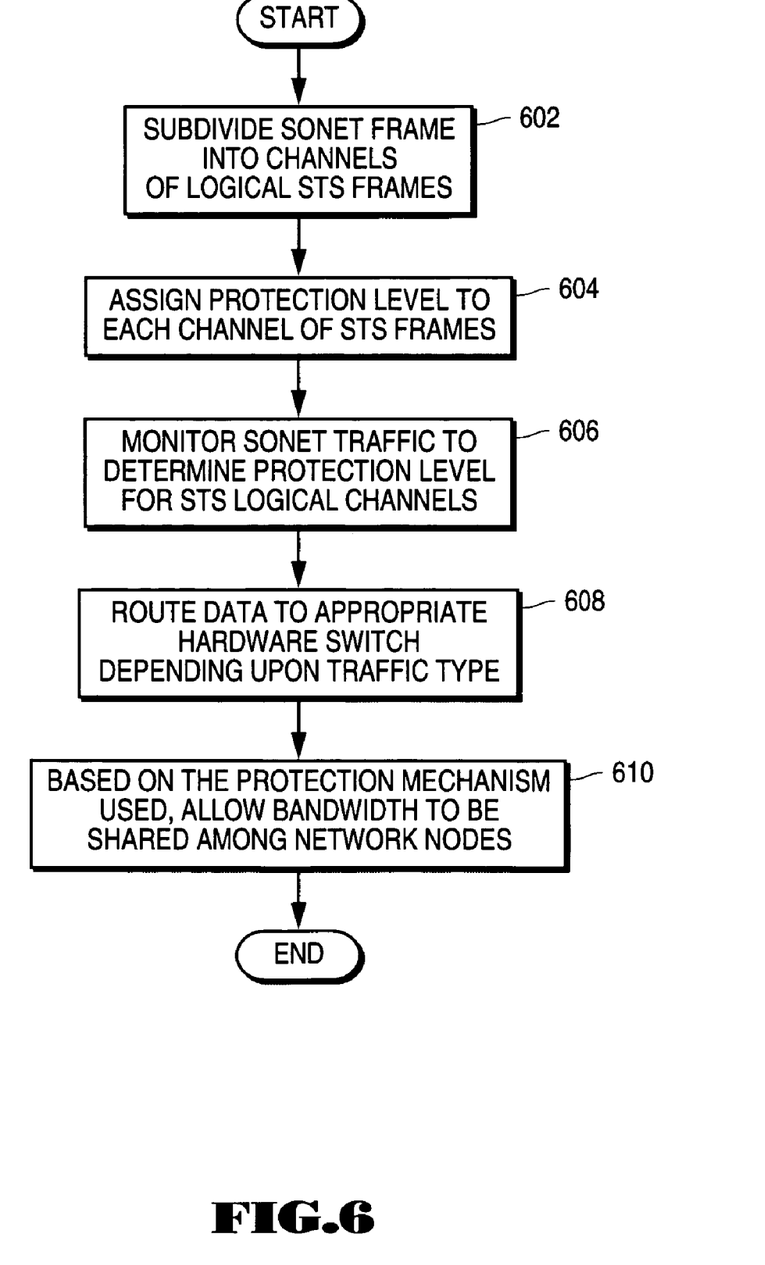
FIG. 6 is a flowchart that illustrates the steps of partitioning a SONET frame into logical channels incorporating different protection levels, according to one embodiment of the present invention.

FIG. 6 is a flowchart that illustrates the steps of partitioning a SONET frame into logical channels incorporating different protection levels, according to one embodiment of the present invention. In step 602, the overall SONET frame is subdivided into a number of logical channels. Each channel includes one or more STS frames, as illustrated in FIG. 4. Depending upon the amount of protection required by the data and the bandwidth requirements of the data within each channel, the appropriate layer of protection is assigned to each channel, step 604. If bandwidth allocation is more important than protection, layer 1 protection is disabled. If full SONET protection is desired, layer 1 protection for that channel is enabled. In this case, layer 2 protection may still be available, if the data within the frames is of the appropriate type (e.g., FR, ATM, etc.), and if the hardware switches are configured to provide proper re-routing.

In step 606, the SONET traffic received by the network element is monitored to determine the type of traffic carried by the logical channels and the protection level assigned to the logical channels. In step 608, the cross-connect circuit routes the SONET traffic to the appropriate hardware switches depending upon the type of data within each logical channel. Based on the protection mechanism used, the bandwidth for that particular channel can be shared among the nodes in the SONET network, step 610.

Typically a SONET network includes an Element Management System (EMS) that is coupled to one or more nodes on the network. The EMS programs its associated nodes with the appropriate protection mechanism. For example, an EMS may program the nodes in the network to provide only level 1 protection to STS frames 5 through 10. The EMS unit implements certain synchronization mechanisms to ensure that all of the appropriate nodes in the network implement the same protection mechanism for the different channels of STS frames. This reduces the possibility that some nodes may implement different protection mechanisms for the same payload frames.

Although some of the figures and associated description are largely directed to embodiments that utilize technology that is specific to fiber optic networks and SONET based networks, in particular, it should be noted that embodiments of the present invention can also be used in the context of other networked computer systems, that implement frame based protocols and protection methods such as those utilized by SONET networks.

In the foregoing, a system has been described for partitioning SONET frames into logical channels to optimize bandwidth utilization and protection mechanisms. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of allocating bandwidth capacity for data frames transmitted over a SONET ring, comprising the steps of:
   subdividing a payload portion of at least one of the SONET data frames comprising a SONET layer into two or more logical channels, each logical channel having associated therewith a predetermined or dynamically configured bandwidth capacity;
   assigning a predetermined or dynamically configured protection mechanism to each logical channel, wherein the predetermined or dynamically configured protection mechanism for each logical channel is balanced against bandwidth utilization requirements of grouped data frames that are grouped depending upon protection desired, and wherein each logical channel can be assigned a different protection mechanism;
   monitoring the SONET ring transmission to determine a type of traffic carried by each logical channel and the protection mechanisms associated with each logical channel;
   routing the data frames to one or more of various hardware switches depending upon the traffic type within each logical channel; and
   sharing bandwidth amongst a plurality of nodes in a SONET network; and
   wherein each SONET data frame includes a plurality of logical channels.

2. The method of claim 1, wherein the SONET data frames comprise a plurality of STS level one frames, wherein the STS-1 frames are grouped together depending upon protection and bandwidth utilization desired.

3. The method of claim 2, wherein the protection mechanism comprises one of a layer 1 SONET protection mechanism and a layer 2 protection mechanism.

4. The method of claim 3, wherein, if the protection mechanism assigned to a particular logical channel is not layer 1, the bandwidth capacity for the particular logical channel is allocated among three or more nodes comprising the SONET ring.

5. The method of claim 3, wherein the layer 1 protection mechanism comprises a bi-directional line switched ring protection mechanism.

6. The method of claim 3, wherein the layer 1 protection mechanism comprises a unidirectional path switched ring protection mechanism.

7. The method of claim 3, wherein the layer 2 protection mechanism comprises at least one of: an Ethernet protection mechanism, an asynchronous transport mode protection mechanism, and a time division multiplexing protection mechanism.

8. A network node for use in a SONET ring, comprising:
   a first circuit configured to subdivide a payload portion of at least one of the SONET data frames comprising a SONET layer into two or more logical channels, each logical channel having associated therewith a predetermined or dynamically configured bandwidth capacity;
   a second circuit configured to assign a predetermined or dynamically configured protection mechanism corresponding to a SONET protection level to each logical channel, wherein the predetermined or dynamically configured protection mechanism is balanced against bandwidth utilization requirements of grouped data frames that are grouped depending upon protection desired, and wherein each logical channel can be assigned a different protection mechanism;
   a third circuit operable to monitor the SONET layer to determine protection mechanisms associated with each logical channel,
   a fourth circuit operable to route the data frames to one or more of various hardware switches depending upon the traffic type within each logical channel;
   a fifth circuit operable to share bandwidth amongst a plurality of nodes in a SONET network; and wherein each SONET data frame includes a plurality of logical channels.

9. The network node of claim 8, wherein the SONET data frames comprise a plurality of STS level one frames.

10. The network node of claim 9, wherein the protection mechanism comprises one of a layer 1 SONET protection mechanism and a layer 2 protection mechanism.

11. The method of claim 10, wherein, if the protection mechanism assigned to a particular logical channel is not layer 1, the bandwidth capacity for the particular logical channel is allocated among three or more nodes comprising the SONET ring.

12. The method of claim 10, wherein the layer 1 protection mechanism comprises a bidirectional line switched ring protection mechanism.

13. The method of claim 10, wherein the layer 1 protection mechanism comprises a unidirectional path switched ring protection mechanism.

14. The method of claim 10, wherein the layer 2 protection mechanism comprises at least one of: an Ethernet protection mechanism, an asynchronous transport mode protection mechanism, and a time division multiplexing protection mechanism.

15. The network node of claim 8, wherein the data frames comprise a plurality of VT-1.5 level frames.

16. The method of claim 2, wherein the data frames comprise a plurality of non-contiguous STS level one frames.

17. The network node of claim 9, wherein the data frames comprise a plurality of non-contiguous STS level one frames.

18. The method of claim 1, further comprising
storing data from two or more logical channels within a single one of the SONET data frames.

19. The method of claim 1, wherein the one or more logical channels of the SONET layer are transmitted over a common fiber channel.

20. The network node of claim 8, wherein the first circuit is further configured to store data from two or more logical channels within a single one of the SONET data frames.

21. The network node of claim 8, wherein the one or more logical channels of the SONET layer are transmitted over a common fiber channel.

* * * * *